Patented May 15, 1934

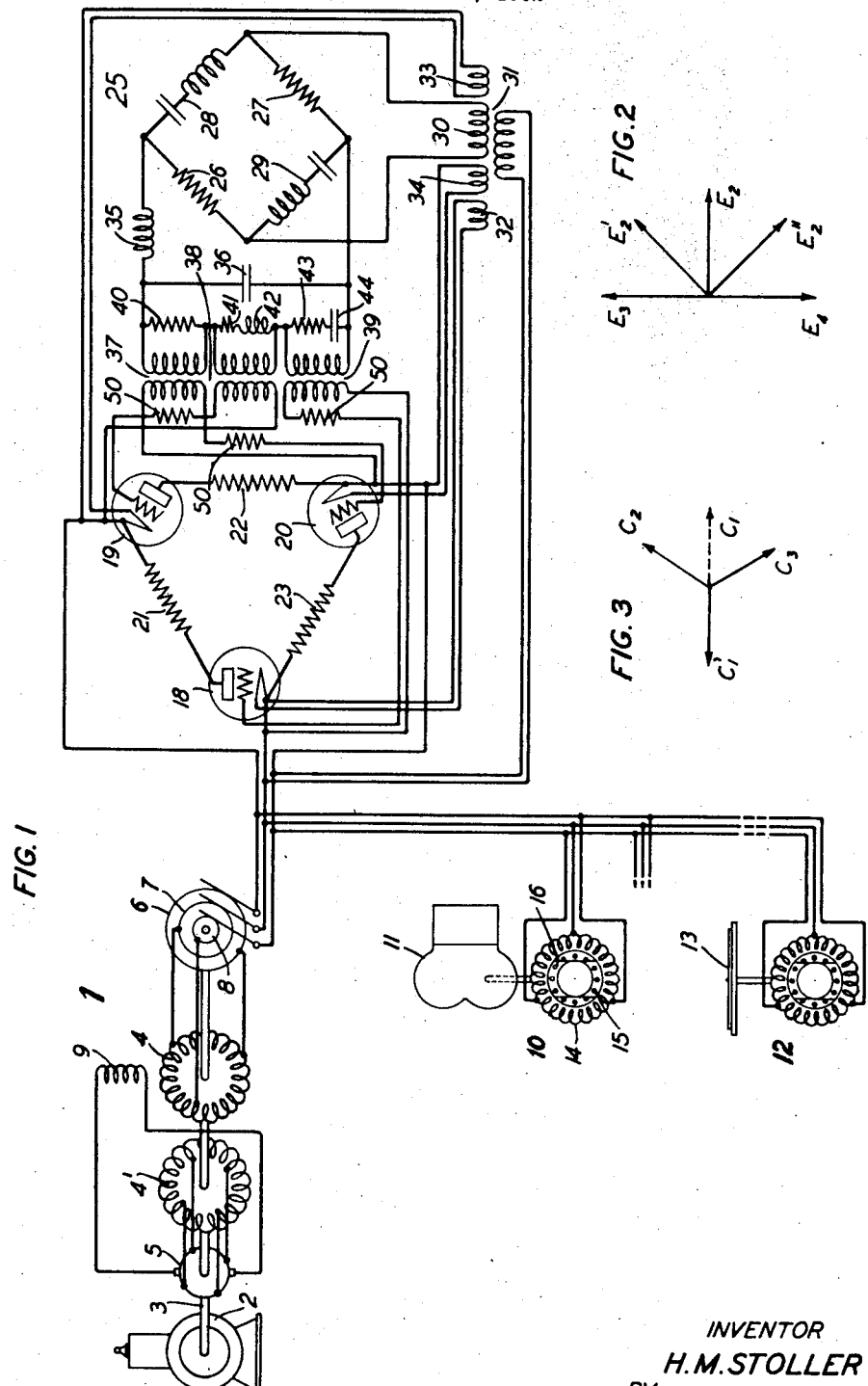

1,958,596

UNITED STATES PATENT OFFICE 1,958,596

CONTROL SYSTEM

Hugh M. Stoller, Mountain Lakes, N. J., assignor to Bell Telephone Laboratories, Incorporated, New York, N. Y., a corporation of New York Application January 7, 1932, Serial No. 585,229

18 Claims. (Cl. 290—40)

This invention relates to motor control systems and particularly to systems for operating a plurality of motors synchronously at constant speed.

One object of the invention is to provide a control system having a plurality of motors operating in synchronism and supplied with current from an alternating current generator that shall automatically vary the load on the generator according to the frequency variations thereof for controlling the speed of the generator to supply a constant frequency current to the motors.

Another object of the invention is to provide a control system having a plurality of synchronous motors connected to an alternating current generator of limited capacity driven by an internal combustion engine of limited capacity that shall automatically vary an auxiliary load on the generator according to the frequency variations thereof for controlling the generator speed to supply constant frequency current to the motors and maintain the speed thereof constant.

Another object of the invention is to provide a control system having a plurality of synchronous motors connected to an alternating current generator of limited capacity driven by an internal combustion engine of limited capacity and an auxiliary load on the generator comprising space discharge devices that shall automatically vary the impedance of the devices according to the frequency variations of the generator for varying the auxiliary load to maintain the frequency of the current supplied to the motors substantially constant.

A further object of the invention is to provide a control system having a plurality of synchronous motors connected to a polyphase generator of limited capacity and an auxiliary load connected across the generator terminals and comprising three-element space discharge devices that shall impress potential on the grids of said devices from a Wheatstone bridge circuit provided with a tuned circuit arm, the potential having a phase variation with respect to the potential on the plates of the devices which varies according to the frequency of the generator for varying the load on the generator to maintain the frequency of the current supplied to the motors substantially constant.

In recording sound pictures, a number of service motors connected to the cameras and the sound recording machines are operated synchronously and at constant speed. It is necessary to operate the service motors synchronously and at constant speed to obtain sound pictures of good quality. In many cases it is impossible and undesirable to record the sound pictures in a studio. In such cases it is desirable to provide a sound picture recording system which can be conveniently transported to the place where the sound pictures are to be taken.

The sound picture recording system constructed in accordance with the invention is simple in construction and may be readily transported to different locations for taking sound pictures. The system is provided with means for operating all the camera motors and the sound recording motors synchronously and at substantially constant speed.

In the disclosed sound picture recording system the cameras and sound recording machines are operated by synchronous induction motors. A three-phase generator which is preferably operated by an internal combustion engine supplies current for operating the camera and sound recording motors. Inasmuch as the camera and sound recording motors operate synchronously in accordance with the frequency of the generated current, it is essential to maintain the generator frequency constant in order to operate the motors synchronously at constant speed. The generator frequency is maintained constant by applying an auxiliary load to the generator which varies according to the generator frequency. The auxiliary load varies the load on the engine and the generator speed to maintain the frequency of the current supplied to the motors substantially constant.

The auxiliary load which is applied to the generator preferably comprises three-element space discharge devices and resistance elements which are connected in delta across the terminals of the generator. The space discharge devices are preferably Thyratron argon-filled tubes. The effective impedances of the space discharge devices are controlled by impressing a variable potential on the grids of the devices and varying the phase relation of the potentials impressed upon the grids with respect to the potentials on the plates in accordance with the variations in generator frequency. It is apparent that the effective impedance of the tubes and the amount of current flowing therethrough will vary according to the phase relation between the potentials on the plates and grids. If the plates and grids of the space discharge devices are positive at the same time for any length of time, the effective impedance of the tubes will be small, whereas if the grids have negative potentials impressed thereon when the plates are positive, the effective impedance of the tubes will be high. The effective impedance of the tubes is varied by varying the time interval during the positive half wave of plate voltage in which the space current is permitted to flow. The plates and grids of the tube will simultaneously have positive potential thereon for varying lengths of time according to the frequency of the generator.

A Wheatstone bridge circuit comprising two resistance arms and two tuned circuit arms is provided for impressing potentials on the grids of the space discharge devices. The two tuned circuit arms of the Wheatstone bridge are tuned to the frequency produced by the generator when the motors are operated at normal speed. The two resistance arms are of such value as to slightly unbalance the bridge when the generator is operating at normal speed and supplying constant frequency current to the motors. The unbalancing of the bridge by the two resistance arms serves to produce a permanent voltage component in the output circuit of the bridge which is in phase with the line voltage at the input terminals of the bridge and in phase with the current in the output circuit. Another voltage component is produced in the output circuit of the bridge which varies in accordance with the frequency of the generator current. Two opposite vertices of the bridge are assumed to be connected across one phase of the generator.

The second voltage component which varies according to the frequency of the generator will lead the permanent voltage component when the frequency of the generator is above normal and the generator is being operated above normal speed, and will lag behind the permanent voltage component when the generator is being operated below normal speed to produce current having a frequency below normal. The voltage or potential which is impressed upon the grids of the space discharge devices is the resultant of the permanent voltage component produced by the unbalancing of the resistance arms of the bridge and the component of voltage varied in accordance with the frequency of the generator. The resultant component of voltage will be leading when the generator is being operated above normal speed to produce a current of slightly higher than normal frequency and will be lagging when the generator is being operated below normal speed. The phase relation of this resultant component of voltage in the output circuit of the Wheatstone bridge circuit with respect to the potentials on the plates of the space discharge devices serves to control the impedances of the space discharge devices.

Inasmuch as the generator produces a three-phase current and three space discharge devices are respectively connected across the three phases of the generator, it is essential to impress potentials on the grids of the space discharge devices which have a relative phase relation corresponding to the relative phase relation of the potentials impressed upon the plates. Potentials of the proper phase relation for impressing upon the grids of the space discharge devices are obtained by inserting resistance, resistance and capacity, and resistance and inductance in the output circuit of the Wheatstone bridge circuit. The primary winding of a transformer is connected across the resistance and capacity for supplying potential to the grid of the space discharge device connected across one of the generator phases; the primary winding of another transformer is connected across the resistance and inductance for supplying potential to the grid of the space discharge devices connected across another of the generator phases; and the primary winding of a third transformer is connected across the pure resistance with the secondary winding terminals thereof reversed for supplying potential to the grid of the third space discharge device. The resistance associated with the inductance in the output circuit of the Wheatstone bridge circuit and the resistance associated with the capacity in the Wheatstone bridge output circuit are so varied as to obtain voltage vectors 120° apart. The voltage vector obtained by connecting the third transformer across the pure resistance in the Wheatstone bridge output circuit will be 60° distant from each of the vectors produced by the resistance and inductance, and the resistance and capacity. The terminals of the secondary winding of the transformer connected across the pure resistance in the Wheatstone bridge output circuit are reversed in order to change the position of the pure resistance vector and separate all vectors by 120° as it is necessary to impress potentials on the grids of the space discharge devices which have the same relation as the potentials impressed on the plates of said devices from the generator circuit.

The maximum load impressed on the generator by the space discharge devices is assumed to exceed the corresponding power capacity of the engine driving the generator. Assuming the generator to normally have a frequency of 60 cycles, it is assumed that if the frequency of the generator is 59.5 cycles, the control unit will impose a negligible load upon the generator whereas if the frequency of the generator rises to 60.5 cycles, the control unit will impose a maximum load thereon. It is expected that this maximum load figure will be of the order of 500 watts corresponding to an anticipated generator rating of 750 watts, and an engine power of 1½ H. P. Since internal combustion engines have a drooping speed characteristic with increase in load, any increase in generator load causes the speed and hence the frequency of the generator to decrease and vice versa.

Fig. 1 is a diagrammatic view of a sound recording system constructed in accordance with the invention.

Fig. 2 is a vector diagram showing the phase relation of the potentials in the output circuit of the Wheatstone bridge circuit.

Fig. 3 is a vector diagram illustrating the phase relation of the potentials impressed upon the grids of the space discharge devices.

Referring to Fig. 1 of the drawing, a three-phase generator 1 is shown directly connected to an internal combustion engine 2 by means of a shaft 3. The generator 1 comprises an armature winding 4 which is connected to three slip rings 6, 7 and 8. A second armature winding 4' preferably of lower voltage is connected to a commutator 5. A field winding 9 for the generator is connected across the brushes on the commutator 5. The generator 1 which is shown as a three-phase generator supplies alternating current for operating a number of service motors synchronously. In Fig. 1 of the drawing, one service motor 10 is shown connected to a camera 11 and a second service motor 12 is shown connected to a sound recording machine 13. The service motors 10 and 12 and the other service motors which may be connected in parallel to the slip rings of the generator 1 are similar in construction and operation. The service motor 15

10 is shown comprising a three-phase stator winding 14 and a squirrel cage rotor winding 15. The iron core 16 of the motor rotor is cut away as indicated in Fig. 1 of the drawing in order to form two salient poles and thus insure the motor giving synchronous speed after acceleration.

The synchronous induction motors 10 and 12 which have their stator windings connected in parallel to the slip rings of the generator 1 will operate synchronously in accordance with the frequency of the generator. If the motors are to be maintained at constant speed, it is essential to maintain the frequency and therefore the speed of the generator 1 substantially constant. The speed of the generator is controlled by placing an auxiliary load on the generator which is varied in accordance with the variations in generator frequency. Preferably, the maximum value of total load is higher than the total corresponding power of the engine. If the generator is assumed to have a rated load of the order of 750 watts, it is assumed that the maximum auxiliary load which may be placed on the generator is of the order of 500 watts.

The auxiliary load on the generator 1 which is varied to control the generator speed comprises three space discharge devices 18, 19 and 20 and three resistance elements 21, 22 and 23. The space discharge devices 18, 19 and 20 are preferably "Thyratron" argon-filled tubes of the three-element type. Filaments of the devices 18, 19 and 20 are respectively connected to the slip rings 7, 8 and 6 of the generator 1 to effect a delta connection with resistance elements 21, 22 and 23 across the three phases of the generator. The effective impedances of the space discharge devices 18, 19 and 20 are varied for varying the auxiliary load on the generator by varying the phase relation between the potentials on the plates with respect to the potentials on the grids of the devices. The potentials impressed on the grids of the devices are varied in accordance with the variations in generator frequency in order to control the generator speed and accordingly the frequency of the current supplied to the service motors 10 and 12.

A Wheatstone bridge circuit 25 having two resistance arms 26 and 27 and two tuned circuit arms 28 and 29 is provided for controlling the potentials impressed on the grids of the space discharge devices 18, 19 and 20. Two opposite vertices of the Wheatstone bridge circuit 25 are connected to the secondary winding 30 of transformer 31, the primary winding of which is connected across one phase of the generator 1. Transformer 31 is provided with three other secondary windings 32, 33 and 34 which respectively supply heating current to the grids of the space discharge devices 18, 19 and 20.

The two tuned circuit arms 28 and 29 are tuned to the frequency produced by the generator when operated at normal speed so that a frequency balance is obtained when the generator is operating at normal speed. The two resistance arms 26 and 27 are made of such size as to slightly unbalance the bridge when the generator is operated at normal speed to produce a voltage vector in the bridge output circuit which is in phase with the line voltage at the input vertices of the bridge. The Wheatstone bridge circuit with the exception of the unbalancing thereof by the resistance arms 26 and 27 operates in a manner similar to the Wheatstone bridge circuit disclosed in the patent to H. M. Stoller No. 1,695,035, dated December 11, 1928.

In addition to the permanent voltage component in the bridge output circuit caused by unbalancing resistance arms 26 and 27, a component at right angles to the first mentioned component is produced which varies in accordance with the frequency of the generator. If the generator frequency is above normal, the second component which varies with the generator frequency will lead the permanent component by 90°. If the generator is operating below normal speed to produce a frequency below normal, the component which varies according to the generator frequency will lag behind the permanent component.

Referring to Fig. 2 of the drawing, a vector diagram is shown to illustrate the voltage components produced in the output circuit of the Wheatstone bridge circuit. The vector $E_2$ is assumed to be the permanent voltage component produced by unbalancing the resistance arms 26 and 27. This vector is in phase with the current to the bridge and in phase with the line voltage at the bridge input terminals. If the generator is operating above normal speed, a voltage vector $E_3$ will be produced which leads the permanent vector or component $E_2$ by 90°. If the generator is operating below normal speed, a vector $E_4$ will be produced which lags behind the permanent vector $E_2$ by 90°. The resultant of the vectors $E_2$ and $E_3$ is indicated by the vector $E'_2$. The resultant of the vectors $E_2$ and $E_4$ is indicated by the vector $E''_2$. It is to be understood that the length of the vectors $E_3$ and $E_4$ vary according to the variations in the generator frequency above or below normal value, whereas the length of the vector $E_2$ remains substantially constant.

A filter comprising an inductance 35 and a capacity 36 is provided in the Wheatstone bridge output circuit for removing the higher frequency harmonics. Three transformers 37, 38 and 39 are provided for connecting the grids of the tubes 20, 19 and 18 to the output circuit of the Wheatstone bridge circuit. The primary winding of the transformer 37 is connected across a resistance element 40 in the bridge output circuit. The primary winding of the transformer 38 is connected across a resistance 41 and an inductance 42 in the bridge output circuit and the primary winding of the transformer 39 is connected across a resistance 43 and a capacity 44 in the bridge output circuit. The primary windings of transformers 37, 38 and 39 are so connected across resistance, inductance and capacity elements in the bridge output circuit to obtain potentials for impressing upon the grids of the space discharge devices which have the same relative phase relation as the potentials impressed on the plates of the space discharge devices.

The potential obtained from across the resistance element 40 in the bridge output circuit is assumed to be represented by the dotted vector $C_1$ in Fig. 3 of the drawing. The resistance associated with the inductance 42 in the bridge output circuit is varied to obtain a vector $C_2$ shown in Fig. 3 of the drawing which leads the vector $C_1$ by 60°. The resistance 43 associated with capacity 44 is varied to obtain a voltage vector $C_3$ which lags behind the vector $C_1$ by 60°. Thus I have two vectors $C_2$ and $C_3$ which are 120° apart as is necessary to obtain potentials for impressing on the grids of the space discharge devices which have the same phase relation as the potentials on the plates of the devices. In order to separate the vector $C_1$ 120° from the vectors $C_2$ and $C_3$, the secondary winding of the transformer 37 is reversed to obtain a vector $C'_1$ which is separated 120° from the voltage vectors $C_2$ and $C_3$.

The voltages indicated by the vectors $C'_1$, $C_2$ and $C_3$ are respectively impressed on the grids of the tubes 20, 19 and 18. The relative phase angles of these vectors are the same as the voltage vectors representing the potential on the plates of the space discharge devices. Moreover, the phase relation of the vectors $C'_1$, $C_2$ and $C_3$ with respect to the potentials on the plates of the space discharge devices is varied according to the frequency of the generator current as was explained when reference was made to Fig. 2 of the drawing. If the generator is operating above normal speed, the phase relation of the potentials on the grids of the space discharge devices with respect to the potentials on the plates will be such that the grids and plates of the devices will have positive potential impressed on them simultaneously for appreciable periods. This will lower the effective impedance of the space discharge devices and will raise the value of the auxiliary load on the generator. If the generator is operating below normal speed to produce a frequency below normal, the phase relation of the potentials on the grids of the space discharge devices with respect to the potentials on the plates will be such that the grids will have little positive potential on them when positive potential is impressed upon the plates of the space discharge devices. This will increase the effective impedance of the space discharge devices and will lower the load on the generator to increase the generator speed. The above operation is continued to maintain the generator speed substantially constant and supply substantially constant frequency current to the service motors 10 and 12.

If the generator normally supplies a three-phase, 60 cycle current to the service motors, it is assumed that the frequency will be held between 59.5 cycles and 60.5 cycles. Moreover, it is assumed that the maximum load which may be produced by the space discharge devices and the associated resistance elements is of the order of 500 watts if the generator has a rating of approximately 750 watts. The speed of the service motors will not change more than ±.5%. Resistance elements 50 are shown in circuit with the grids of the space discharge devices 18, 19 and 20 for limiting the grid currents of the tubes to a value which will not overload the Wheatstone bridge circuit.

Modifications in the system and in the arrangement and location of parts may be made within the spirit and scope of the invention and such modifications are intended to be covered by the appended claims.

What is claimed is:

1. In a control system, a plurality of synchronous motors, an alternating current generator for supplying current to effect synchronous operation of said motors, a prime mover having a drooping speed characteristic for driving said generator, an auxiliary load on said generator, and means having all parts thereof stationary for automatically varying said auxiliary load according to the frequency of the generator current to supply constant frequency current to said motors.

2. In a sound picture recording system, a plurality of service motors, an alternating current generator for supplying current to effect synchronous operation of said service motors, a prime mover having a drooping speed characteristic for driving said generator, and means having all parts thereof stationary for varying the load on said generator and the prime mover according to the frequency of the generated current to maintain the frequency of the current supplied to the service motors substantially constant.

3. In a control system, a plurality of synchronous motors, an alternating current generator for supplying current to effect synchronous operation of said motors, a prime mover of limited capacity for driving said generator, an auxiliary load on said generator comprising gas-filled space discharge devices, and means for varying the impedance of said gas-filled devices according to the frequency of said generator to vary the load on the generator and the prime mover and maintain a constant frequency current for the motors.

4. In a control system, a plurality of synchronous motors, an alternating current generator for supplying current to effect synchronous operation of said motors, a prime mover of limited capacity for driving said generator, an auxiliary load on said generator comprising three-element gas-filled space discharge devices, and means for varying the phase relation of the potentials impressed on the grids of said devices with respect to the plate potentials according to the frequency of said generator to vary the impedance of said devices and the load on the generator and the prime mover to maintain a constant frequency current for the motors.

5. In a control system, a plurality of synchronous motors, an alternating current generator for supplying current to effect synchronous operation of said motors, an engine having a drooping speed characteristic for driving said generator, an auxiliary load on said generator comprising space discharge devices, and means comprising a Wheatstone bridge circuit connected to said generator for varying the impedance of said discharge devices according to the frequency variations of said generator to maintain the frequency of the current supplied to said motors substantially constant.

6. In a control system, a plurality of synchronous motors, an alternating current generator for supplying current to effect synchronous operation of said motors, an auxiliary load on said generator comprising three-element gas-filled space discharge devices, and means comprising a Wheatstone bridge circuit connected to said generator for varying the phase relation of the potentials impressed on the grids of said tubes with respect to the plate potentials according to the generator frequency to vary the load on the generator and maintain the frequency of the current supplied to said motors substantially constant.

7. In a control system, a plurality of synchronous motors, an alternating current generator for supplying current to effect synchronous operation of said motors, an engine having a drooping speed characteristic for driving said generator, an auxiliary load for said generator comprising space discharge devices and resistance elements, a Wheatstone bridge circuit comprising resistance and tune circuit arms, and means comprising said bridge circuit for varying the impedance of said devices and the load on the generator and the engine according to the frequency variations of said generator to maintain the frequency of the current supplied to said motors substantially constant.

8. In a control system, a plurality of three-phase synchronous motors, a three-phase generator for supplying current to effect synchronous operation of said motors, an auxiliary load for said generator comprising a space discharge device and an impedance element connected across each phase of the generator, a Wheatstone bridge circuit comprising two resistance arms and two tuned circuit arms, and means comprising said bridge circuit for varying the impedance of said space discharge devices and the load on the generator according to the frequency variations of said generator to maintain the frequency of the current supplied to said motors substantially constant.

9. In a control system, a plurality of three-phase motors, a three-phase generator for supplying current to effect synchronous operation of said motors, a three-element space discharge device in series with a resistance element connected across each phase of said generator, a Wheatstone bridge circuit comprising two resistance arms and two arms tuned to the normal generator frequency, two opposite vertices of said bridge circuit being connected across one phase of said generator, and means connected to the other vertices of said bridge circuit for varying the phase relation of the potentials impressed on the grids of said devices with respect to the phase of the potentials on the plates of the devices according to the generator frequency variations to vary the load on the generator and maintain the frequency of the current supplied to the motors substantially constant.

10. In a control system, a plurality of three-phase motors, a three-phase generator for supplying current to effect synchronous operation of said motors, an engine having a drooping speed characteristic for driving said generator, a three-element space discharge device in series with a resistance element connected across each phase of said generator, and means for varying the phase relation of the potentials impressed on the grids of said devices with respect to the phase of the potentials on the plates of the devices according to the generator frequency variations to vary the load on the generator and maintain the frequency of the current supplied to the motors substantially constant.

11. In a control system, a plurality of synchronous motors, a generator for supplying alternating current to said motors to effect synchronous operation thereof, an engine having a drooping speed characteristic for driving said generator, an auxiliary load on said generator comprising a three-element space discharge device, and means for impressing a potential on the grid of said device and for varying the phase relation between the potentials on the plate and grid of said device according to the generator frequency variations to vary the generator load and maintain the frequency thereof constant.

12. In a control system, a plurality of polyphase synchronous motors, a generator for supplying polyphase current to said motors to effect synchronous operation thereof, means comprising three-element space discharge devices connected to the respective generator phases for placing a variable load on the generator to maintain the frequency thereof constant, a Wheatstone bridge circuit comprising impedance and tuned circuit arms and having two opposite vertices connected across one phase of said generator to deliver a current in the output circuit having a phase variation according to the generator frequency variation, and means for impressing potentials on the grids of said devices which have a phase relationship according to the phast relationship of the potentials on the plates, said bridge circuit varying the phase relation of the potentials on the grids with respect to the potentials on the plates according to the generator frequency to vary the load on the generator and maintain the frequency of the current supplied to the motors substantially constant.

13. In a control system, a plurality of three-phase synchronous motors, a generator for supplying three-phase current to said motors to effect synchronous operation thereof, means comprising three-element space discharge devices connected to the respective generator phases for placing a variable load on the generator, a Wheatstone bridge circuit comprising impedance and tuned circuit arms and having two opposite vertices connected across one phase of said generator, the bridge output circuit being connected to the other two vertices of the bridge, resistance, capacity and inductance elements in said output circuit, and means for coupling the grids of said space discharge devices to said resistance, capacity and inductance elements in said output circuit for impressing potentials on the grids of the devices which have a phase relationship corresponding to the phase relationship of the potentials on the plates of the devices.

14. In a control system, a plurality of polyphase motors, a polyphase generator for supplying current to effect synchronous operation of said motors, means comprising three-element space discharge devices connected to the various generator phases for placing a variable load on the generator, a Wheatstone bridge circuit comprising impedance and tuned circuit arms and having two opposite vertices connected across one phase of said generator, the output circuit of said Wheatstone bridge being connected across the other two vertices of the bridge, resistance, capacity and inductance elements in said output circuit, and means for coupling the grids of said space discharge devices to said resistance, capacity and inductance elements for impressing potentials on the grids of the devices which have a phase relationship according to the phase relationship of the potentials on the plates, said bridge circuit varying the phase relation of the potentials on the grids with respect to the potentials on the plates according to the generator frequency to vary the load on the generator and maintain the frequency of the current supplied to the motors substantially constant.

15. In a control system, a plurality of synchronous motors, an alternating current generator for supplying current to effect synchronous operation of said motors, means comprising a three-element space discharge device for applying an auxiliary load on said generator, a Wheatstone bridge circuit connected to said generator and comprising resistance arms and a tuned circuit arm, the tuned circuit arm being tuned to the normal generator frequency and the resistance arms being of such size as to unbalance the bridge when the generator frequency is normal, and means comprising said Wheatstone bridge circuit for controlling said space discharge device according to the generator frequency to supply constant frequency current to the motors.

16. In a control system, a plurality of three-phase synchronous motors, a three-phase generator for supplying current to effect synchronous operation of said motors, a three-element space discharge device connected across each phase of said generator, a Wheatstone bridge circuit comprising two resistance arms and two tuned circuit arms, the tuned circuit arms being tuned to the normal generator frequency and the resistance arms being of such size as to unbalance the bridge when the generator frequency is normal, and means comprising said bridge circuit for varying the impedance of said devices and the load on the generator according to the frequency variations of the generator to maintain the frequency of the current supplied to the motors substantially constant.

17. In a control system, an electric generator, a load circuit connected to said generator, a prime mover having a drooping speed characteristic for driving said generator, an auxiliary load on said generator, and means having all parts thereof stationary for automatically varying said auxiliary load according to the speed of the generator to maintain the generator speed substantially constant.

18. In a control system, an electric generator, a load circuit connected to said generator, a prime mover having a drooping speed characteristic for driving said generator, an auxiliary load on said generator comprising a space discharge device, and means for varying the impedance of said device according to the speed of the generator to maintain the generator speed substantially constant.

HUGH M. STOLLER.